US011661021B2

(12) United States Patent
Iwamoto (10) Patent No.: US 11,661,021 B2
(45) Date of Patent: May 30, 2023

(54) VEHICLE BODY FRONT STRUCTURE

(71) Applicant: SUBARU CORPORATION, Tokyo (JP)

(72) Inventor: Mitsuhiro Iwamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 133 days.

(21) Appl. No.: 17/212,624

(22) Filed: Mar. 25, 2021

(65) Prior Publication Data

US 2021/0331640 A1    Oct. 28, 2021

(30) Foreign Application Priority Data

Apr. 27, 2020  (JP) .............................. JP2020-078095

(51) Int. Cl.
*B60R 19/12* (2006.01)
*B60R 19/18* (2006.01)
*B60R 21/00* (2006.01)

(52) U.S. Cl.
CPC .............. *B60R 19/12* (2013.01); *B60R 19/18* (2013.01); *B60R 2021/0004* (2013.01)

(58) Field of Classification Search
CPC .. B60R 19/12; B60R 19/18; B60R 2021/0004
See application file for complete search history.

(56) References Cited

FOREIGN PATENT DOCUMENTS

DE    102018206604 A1 * 10/2019
JP      2015-189407 A    11/2015

* cited by examiner

*Primary Examiner* — Dennis H Pedder
*Assistant Examiner* — Melissa Ann Bonifazi
(74) *Attorney, Agent, or Firm* — McGinn I.P. Law Group, PLLC.

(57) ABSTRACT

A vehicle body front structure includes front frames, first and second bumper beams, sub-frames, gussets, and load transmission members. The front frames extend in a front-rear direction. The first bumper beam is disposed in front of the front frames. The first bumper beam extends in a vehicle width direction. The sub-frames are disposed below the front frames. The sub-frames extend in the front-rear direction. The second bumper beam is coupled to front ends of the sub-frames. Ends of the second bumper beam protrude further outward than the first bumper beam. Each gusset is coupled to a corresponding one of ends of the second bumper beam and a corresponding one of intermediate portions of the sub-frames. The gussets transmit an impact load to the intermediate portions. The load transmission members are coupled to the sub-frames. The load transmission members are disposed on outer side surfaces of the front frame.

20 Claims, 10 Drawing Sheets

FIG. 10

VEHICLE BODY FRONT STRUCTURE

CROSS-REFERENCE TO RELATED APPLICATIONS

The present application claims priority from Japanese Patent Application No. 2020-078095 filed on Apr. 27, 2020, the entire contents of which are hereby incorporated by reference.

BACKGROUND

The disclosure relates to a vehicle body front structure that can ensure an impact load absorption performance for both (i) a small overlap frontal collision and (ii) a full wrap frontal collision or an offset frontal collision.

In recent years, technological development has been promoted to improve collision safety of vehicles such as automobiles. For example, collision safety against an offset frontal collision attracts more attention than that against a small overlap frontal collision (minute overlap frontal collision) in which an overlap amount is smaller than the offset frontal collision in the related art.

The small overlap frontal collision is an offset frontal collision in which part of a vehicle that is located outside a pair of left and right front frames in a vehicle width direction collides with a counterpart. As a countermeasure against the small overlap frontal collision, for example, Japanese Unexamined Patent Application Publication (JP-A) No. 2015-189407 discloses a configuration in which a gusset is fixed on a front frame on an outer side thereof in a vehicle width direction, and an end of a bumper beam extending outward from the front frame in the vehicle width direction is coupled to the gusset. With such a configuration, an impact load in the event of the small overlap frontal collision can be transmitted to the front frame via the gusset, and the impact can be absorbed by bending and deforming the front frame.

SUMMARY

An aspect of the disclosure provides a vehicle body front structure including a pair of left and right front frames, a first bumper beam, a pair of left and right sub-frames, a second bumper beam, gussets, and load transmission members. The pair of left and right front frames extend in a front-rear direction of a vehicle body. The first bumper beam is disposed in front of the front frames. The first bumper beam extends in a vehicle width direction. The pair of left and right sub-frames are respectively disposed below the left and right front frames. The sub-frames extend in the front-rear direction of the vehicle body. The second bumper beam is coupled to front ends of the sub-frames. The second bumper beam extends in such a manner that left and right ends of the second bumper beam protrude further outward in the vehicle width direction than the first bumper beam. Each gusset is coupled to (i) a corresponding one of ends of the second bumper beam and (ii) a corresponding one of intermediate portions of the sub-frames. The gussets are configured to transmit an impact load that is applied to the second bumper beam, to the intermediate portions of the sub-frames. The load transmission members are coupled to the sub-frames respectively in a vicinity of the gussets. The load transmission members are respectively disposed on outer side surfaces of the front frame in the vehicle width direction.

DETAILED DESCRIPTION

As disclosed in JP-A No. 2015-189407, the gusset is generally a thin rigid member. Therefore, in the configuration disclosed in JP-A No. 2015-189407, in the event of the small overlap frontal collision, the gusset causing the front frame to be bent and deformed may further locally transmit the impact load, which is not absorbed simply by the bending and the deformation of the front frame, to an engine, and the engine may be damaged more than necessary.

It is desirable to provide a vehicle body front structure that can ensure an impact load absorption performance for both (i) a small overlap frontal collision and (ii) a full wrap frontal collision or an offset frontal collision, without damaging the engine more than necessary.

Figure 1:
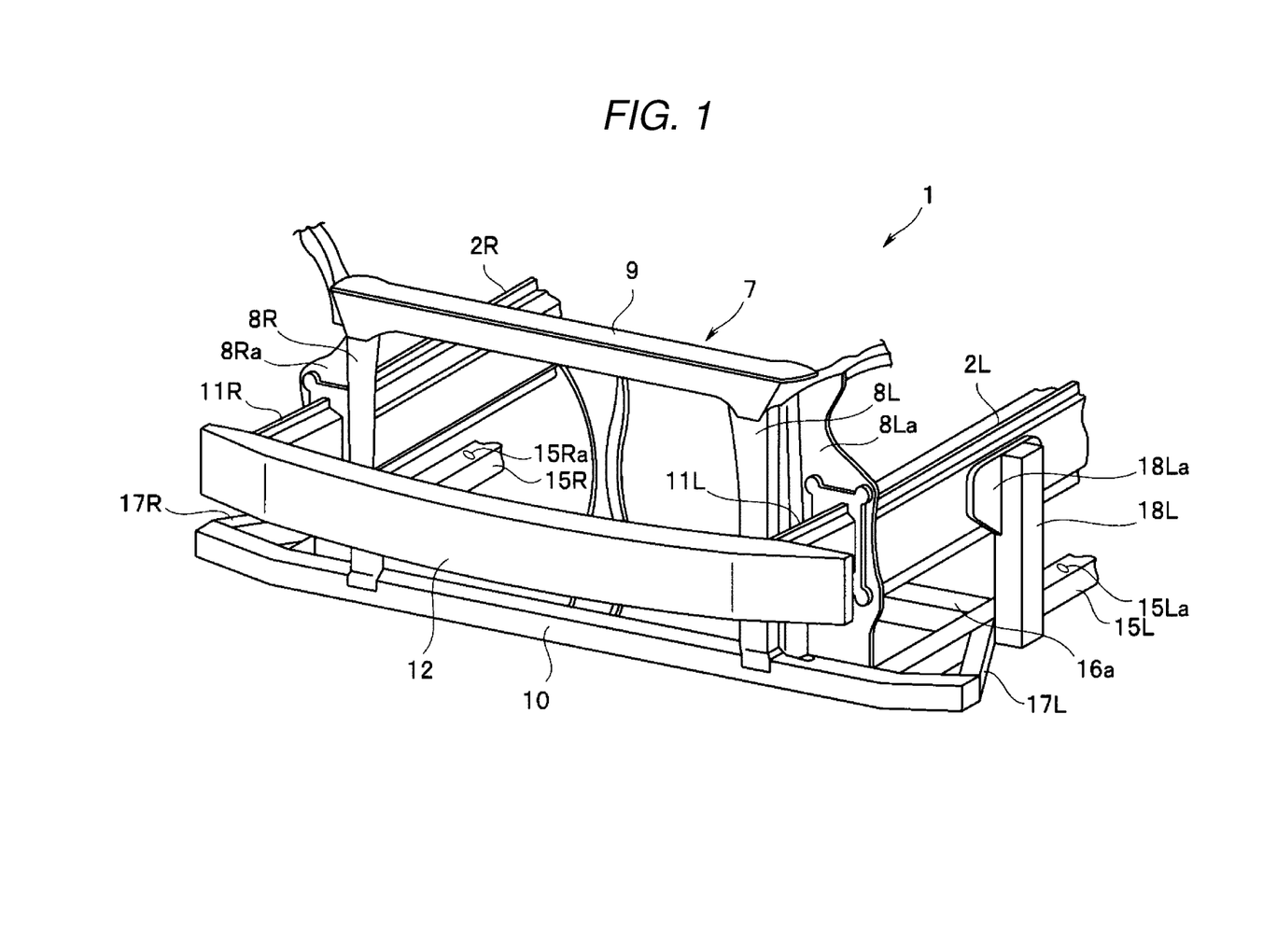
FIG. 1 is a perspective view partially illustrating a frame structure of a front portion of a vehicle body.
Figure 2:
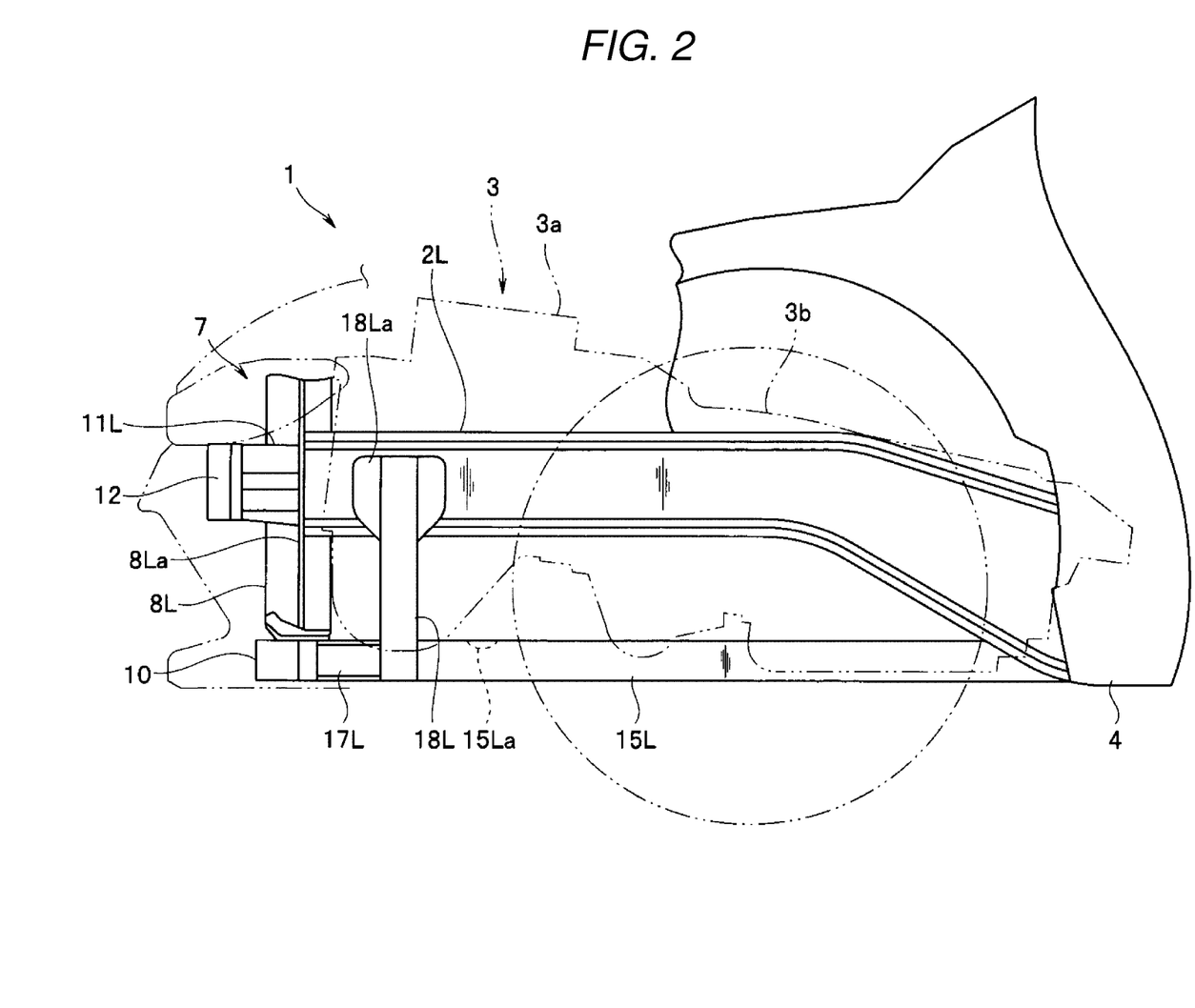
FIG. 2 is a side view partially illustrating the frame structure of the front portion of the vehicle body.
Figure 3:
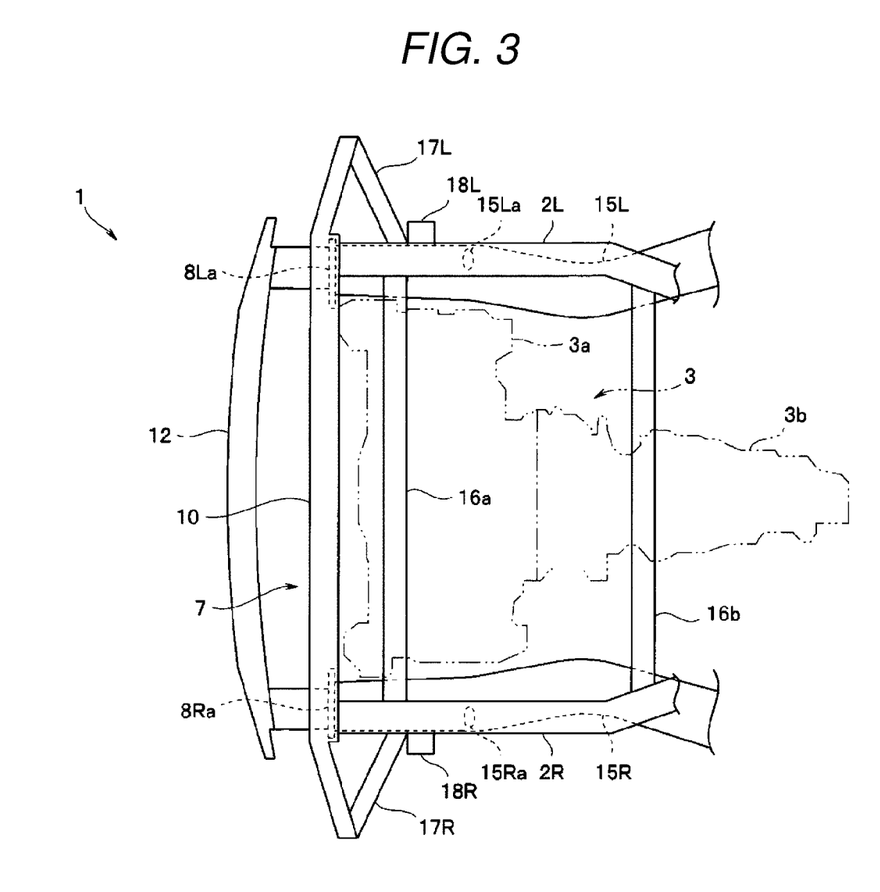
FIG. 3 is a bottom view partially illustrating the frame structure of the front portion of the vehicle body.

FIGS. 1 to 5 illustrate an embodiment of the disclosure. FIG. 1 is a perspective view partially illustrating a frame structure of a front portion of a vehicle body. FIG. 2 is a side view partially illustrating the frame structure of the front portion of the vehicle body. FIG. 3 is a bottom view partially illustrating the frame structure of the front portion of the vehicle body.

As illustrated in FIGS. 1 to 3, a vehicle body 1 is configured by, for example, assembling members on a panel obtained by pressing a steel plate and joining the members by spot welding.

The vehicle body 1 includes a pair of left and right front frames 2L and 2R in the front portion of the vehicle. The left and right front frames 2L and 2R extend in a front-rear direction of the vehicle body 1. A power unit 3 of the vehicle is disposed between the left and right front frames 2L and 2R (see FIGS. 2 and 3). The power unit 3 of the present embodiment is a vertically-mounted power unit. An engine 3a and a transmission 3b are disposed along the front-rear direction of the vehicle body 1.

A part of an intermediate portion of each of the front frames 2L and 2R is bent inward in a vehicle width direction (see FIG. 3). A rear portion thereof is bent downward and coupled to a floor panel 4 (see FIG. 2).

A radiator core support 7 is attached to front ends of the front frames 2L and 2R. The radiator core support 7 is a frame-shaped member surrounding a radiator (not illustrated).

That is, the radiator core support 7 includes a pair of left and right side supports 8L and 8R, an upper support 9 coupled to upper ends of the left and right side supports 8L and 8R, and a lower support 10 coupled to lower ends of the left and right side supports 8L and 8R.

The side supports 8L and 8R are respectively provided with plate-shaped frame attachments 8La and 8Ra protruding outward in the vehicle width direction. The front ends of the front frames 2L and 2R are coupled to rear surfaces of the frame attachments 8La and 8Ra by welding, respectively.

Meanwhile, rear ends of crash boxes 11L and 11R are coupled to front surfaces of the frame attachments 8La and 8Ra, respectively. Further, a first bumper beam 12 extending in the vehicle width direction is coupled to front ends of the crash boxes 11L and 11R.

The crash boxes 11L and 11R are each formed, for example, in a tubular shape by bonding two thin steel plates, each having a hat shape in cross section, by spot welding. In the event of a collision, each of the crash boxes 11L and 11R is crushed like an accordion in an axial direction due to an impact load applied via the first bumper beam 12, thus absorbing a part of impact energy.

The first bumper beam 12 is formed of, for example, a metal member having a closed rectangular shape in cross section or a hat shape in cross section that is open at a front portion. The first bumper beam 12 is curved in a state where a center of the first bumper beam 12 in the vehicle width direction protrudes slightly. Not only an impact in the event of a full wrap frontal collision but also an impact in the event of an offset frontal collision can be applied to the first bumper beam 12.

In the present embodiment, the impact in the event of the small offset frontal collision can be applied to the lower support 10. In one example, the lower support 10 may serve as a "second bumper beam". Therefore, left and right ends of the lower support 10 extend so as to protrude further outward in the vehicle width direction than left and right ends of the first bumper beam 12. The left and right ends of the lower support 10 may protrude further inward in the vehicle width direction than the left and right ends of the first bumper beam 12, or may protrude substantially the same as the left and right ends of the first bumper beam 12. Further, portions of the lower support 10 protruding outward in the vehicle width direction are each bent at a predetermined angle toward the rear of the vehicle body 1.

Front ends of a pair of left and right sub-frames 15L and 15R are coupled to a rear surface of the lower support 10.

The left and right sub-frames 15L and 15R each have, for example, a rectangular cylindrical shape in cross section. Further, the left and right sub-frames 15L and 15R extend below the left and right front frames 2L and 2R in the front-rear direction of the vehicle body 1 so as to sandwich a lower portion of the power unit 3.

The left and right sub-frames 15L and 15R are coupled to each other by cross members 16a and 16b which extend in the vehicle width direction, at two positions in the front-rear direction.

Further, the left and right sub-frames 15L and 15R respectively include, for example, fragile portions 15La and 15Ra, which are made of beads, on upper surfaces thereof at positions behind the front cross member 16a. The fragile portions 15La and 15Ra act as starting points where the sub-frames 15L and 15R start to bend downward when an impact load of a predetermined value or more in the front-rear direction is transmitted to the sub-frames 15L and 15R.

Gussets 17L and 17R are disposed outside the left and right sub-frames 15L and 15R in the vehicle width direction, respectively. The gussets 17L and 17R each have, for example, a rectangular cylindrical shape in cross section. The gussets 17L and 17R directly transmit the impact load in the event of a small overlap frontal collision to intermediate portions of the sub-frames 15L and 15R near front portions thereof.

Each of the gussets 17L and 17R is inclined forward from an inner end thereof to an outer end thereof.

Further, the inner ends of the gussets 17L and 17R are respectively coupled to the outer sides of the sub-frames 15L and 15R in the vehicle width direction at positions corresponding to the front cross member 16a, by welding.

Meanwhile, the outer ends of the gussets 17L and 17R are respectively coupled to rear surfaces of the left and right ends of the lower support 10 by welding. The coupling between the outer ends of the gussets 17L and 17R and the rear surfaces of the left and right ends of the lower support 10 is not limited to welding. For example, the coupling may be implemented by fastening using bolts such that the gussets 17L and 17R can be detached when the impact load of a predetermined value or more is applied to the lower support 10.

Further, the left and right sub-frames 15L and 15R are respectively provided with load transmission members 18L and 18R for transmitting the impact loads, which act on the sub-frames 15L and 15R from the outer side thereof to the inner side thereof in the vehicle width direction, to outer side surfaces of the front frames 2L and 2R.

The load transmission members 18L and 18R each have, for example, a rectangular cylindrical shape in cross section. The load transmission members 18L and 18R extend in an upper-lower direction of the vehicle body 1. Further, lower portions of the load transmission members 18L and 18R are firmly coupled to outer side surfaces of the sub-frames 15L and 15R by welding at positions adjacent to the inner ends of the gussets 17L and 17R, respectively.

Further, upper portions of the load transmission members 18L and 18R are respectively disposed at positions where the upper portions are abutted with the outer side surfaces of the front frames 2L and 2R in the vehicle width direction. That is, the upper portions of the load transmission members 18L and 18R are disposed on the outer side surfaces of the front frames 2L and 2R in the vehicle width direction, respectively, in a state in which relative movement thereof with respect to the front frames 2L and 2R in the front-rear direction is not restrained. That is, the upper portions of the load transmission members 18L and 18R are abutted with or close to the outer side surfaces of the front frames 2L and 2R in the vehicle width direction in the state in which the relative movement thereof with respect to the front frames 2L and 2R in the front-rear direction is not restrained.

Here, the load transmission members 18L and 18R respectively include, at upper ends thereof, plate-shaped abutting plates 18La and 18Ra that can be abutted with the front frames 2L and 2R at least in the event of the small offset frontal collision. That is, the abutting plates 18La and 18Ra are respectively abutted with or close to the outer side surfaces of the front frames 2L and 2R in the vehicle width direction. Further, at least in the event of the small offset frontal collision, the abutting plates 18La and 18Ra can be abutted (surface contact) with the outer side surfaces of the front frames 2L and 2R in the vehicle width direction with a predetermined contact area or more. Accordingly, the load transmission members 18L and 18R can transmit, through the abutting plates 18La and 18Ra, the impact load to the side surfaces of the front frames 2L and 2R over a wide range.

Small Offset Frontal Collision

Figure 5:
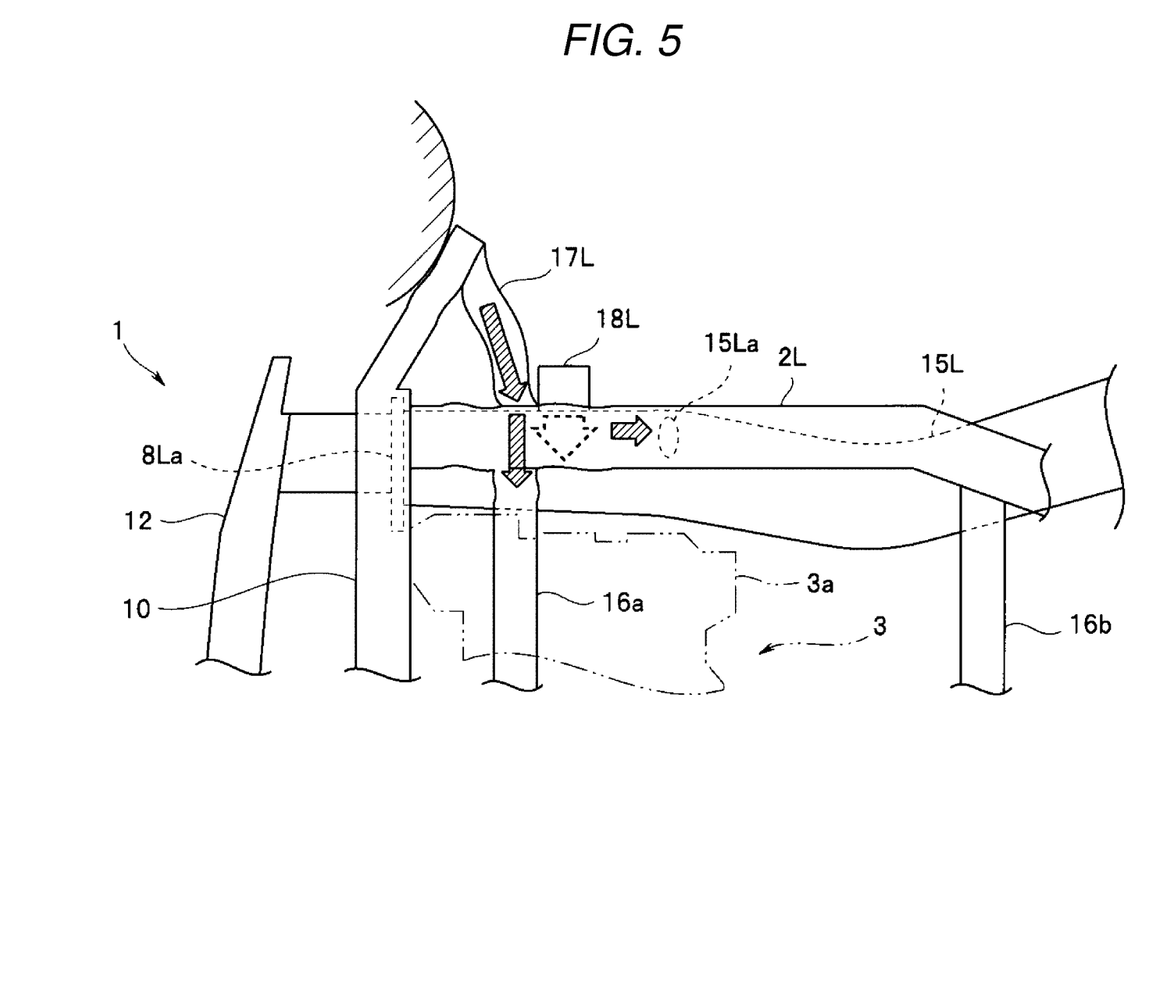
FIG. 5 illustrates an impact load transmitted to the frame of the front portion of the vehicle body in the event of a small offset frontal collision.

In such a configuration, for example, as illustrated in FIG. 5, when the small offset frontal collision occurs at a left portion of the vehicle body 1, the impact load caused by the collision is applied to a left portion of the lower support 10. In one example, the lower support 10 may serve as the "second bumper beam". That is, in the event of the small offset frontal collision, the impact load is not applied to the first bumper beam 12, but the impact load is simply applied to the lower support 10.

The impact load applied to the left portion of the lower support 10 is transmitted to the sub-frame 15L while crushing the gusset 17L. At this time, due to the inclination of the gusset 17L, most of the impact load is converted into a component in the vehicle width direction and transmitted to the sub-frame 15L.

Further, the impact load in the vehicle width direction transmitted to the sub-frame 15L is transmitted to the outer side surface of the front frame 2L via the load transmission member 18L (see a dashed arrow in FIG. 5).

In this case, since the abutting plate 18La is abutted with the side surface of the front frame 2L, the impact load is transmitted to the front frame 2L in a state of being dispersed in a predetermined range instead of being locally transmitted. Accordingly, the front frame 2L is displaced inward in the vehicle width direction to move the power unit 3, instead of being locally deformed due to the transmitted impact load.

That is, the impact load transmitted to the front frame 2L is converted into kinetic energy that moves the power unit 3, which is a heavy object, in the vehicle width direction, thus being dispersed.

Accordingly, in the event of the small overlap frontal collision, the impact load can be appropriately absorbed without damaging the engine 3a more than necessary.

Full Wrap Frontal Collision

Figure 4:
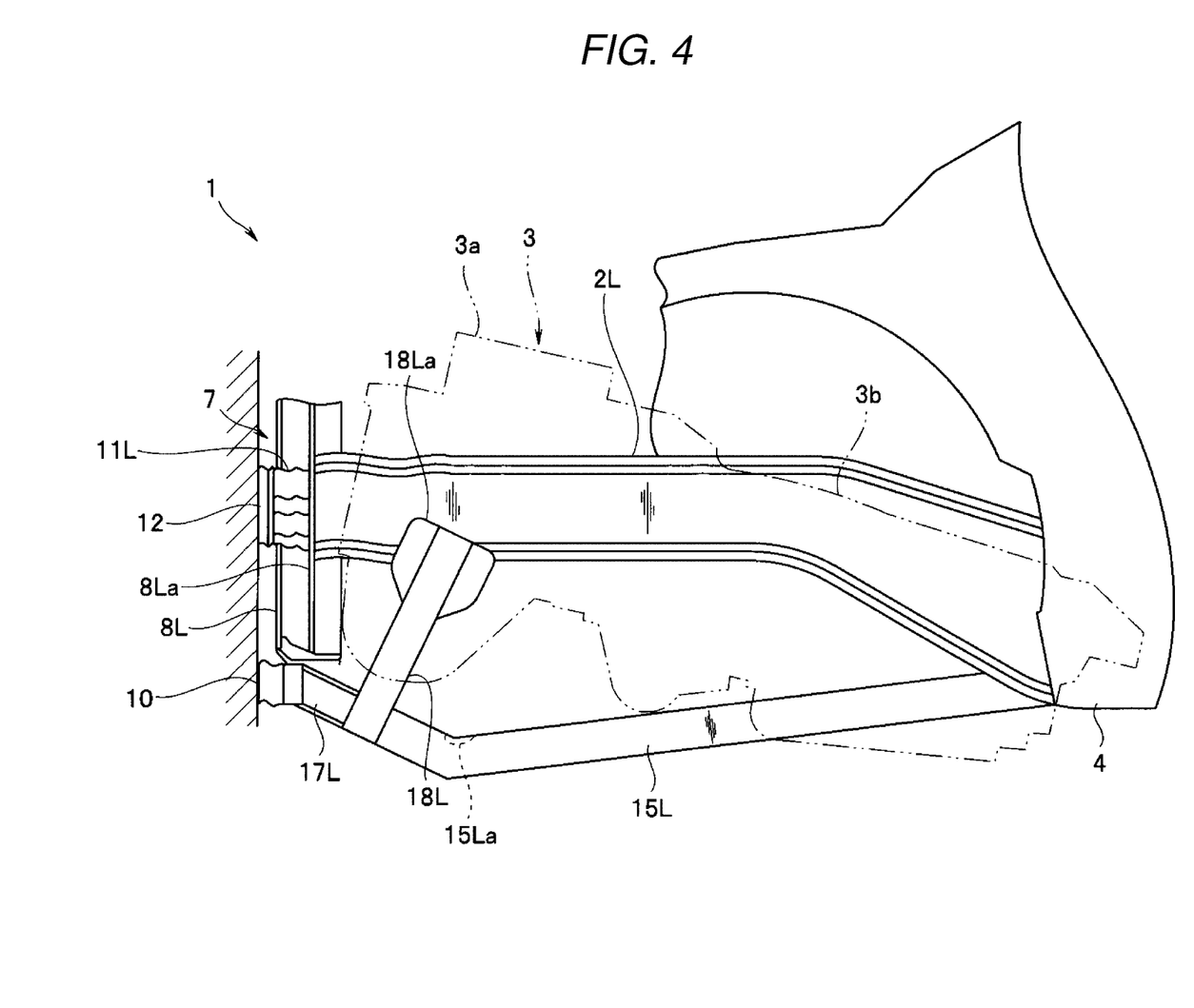
FIG. 4 illustrates a behavior of the frame of the front portion of the vehicle body in the event of a full wrap frontal collision.

Meanwhile, for example, as illustrated in FIG. 4, when a full wrap frontal collision (or an offset frontal collision) occurs at the vehicle body 1, an impact load is applied to the first bumper beam 12. A part of the impact load applied to the first bumper beam 12 is absorbed by crushing the crash boxes 11L and 11R.

Further, the impact load which is not absorbed by the crash boxes 11L and 11R crushes the front frames 2L and 2R. At this time, since the load transmission members 18L and 18R are merely disposed on the side surfaces of the front frames 2L and 2R, the load transmission members 18L and 18R do not inhibit rearward displacements of the front frames 2L and 2R before the impact load is applied to the lower support 10 with a predetermined time difference, as compared to a case in which the load transmission members 18L and 18R are fixed to the side surfaces of the front frames 2L and 2R by welding so as not to be separated from the side surfaces of the front frames 2L and 2R. In addition, the load transmission members 18L and 18R do not become a part which is crushed and left. Therefore, the front frames 2L and 2R is crushed without the load transmission members 18L and 18R inhibiting the front frames 2L and 2R from displacing in the front-rear direction and crushing, so that the front frames 2L and 2R absorbs the impact load.

In the event of the full wrap frontal collision, an impact load is also applied to the lower support 10 with a predetermined time difference, and is transmitted to the sub-frames 15L and 15R. However, when a predetermined impact load or more is applied to the sub-frames 15L and 15R, the sub-frames 15L and 15R are bent downward at the fragile portions 15La and 15Ra during crushing. Therefore, the engine 3a is prevented from being damaged by the crushed sub-frames 15L and 15R.

In this way, even in the event of the full wrap frontal collision, the impact load can be appropriately absorbed without damaging the engine 3a more than necessary.

According to such an embodiment, the vehicle body front structure includes the pair of left and right sub-frames 15L and 15R, the lower support 10 (an example of the second bumper beam), the gussets 17L and 17R, and the load transmission members 18L and 18R. The left and right sub-frames 15L and 15R are disposed below the left and right front frames 2L and 2R, respectively. The left and right sub-frames 15L and 15R extend in the front-rear direction of the vehicle body 1. The lower support 10 is coupled to the front ends of the sub-frames 15L and 15R. The lower support 10 extends such that the left and right ends thereof protrude further outward in the vehicle width direction than the first bumper beam 12. The gussets 17L and 17R are coupled to the ends of the lower support 10 and the intermediate portions of the sub-frames 15L and 15R. The gussets 17L and 17R transmit the impact load applied to the lower support 10 to the intermediate portions of the sub-frames 15L and 15R. The load transmission members 18L and 18R are coupled to the sub-frames 15L and 15R in the vicinity of the gussets 17L and 17R. The load transmission members 18L and 18R are disposed on the outer side surfaces of the front frames 2L and 2R in the vehicle width direction. Therefore, the impact load absorption performance for both (i) the small overlap frontal collision and (ii) the full wrap frontal collision or the offset frontal collision can be ensured without damaging the engine 3a more than necessary.

In this case, since the vehicle body 1 includes the sub-frames 15L and 15R, so that collision absorption energy in the event of the full wrap frontal collision can be increased. Therefore, cross sections of the front frames 2L and 2R can be reduced, and maintainability of the engine 3a can be improved.

Figure 6:
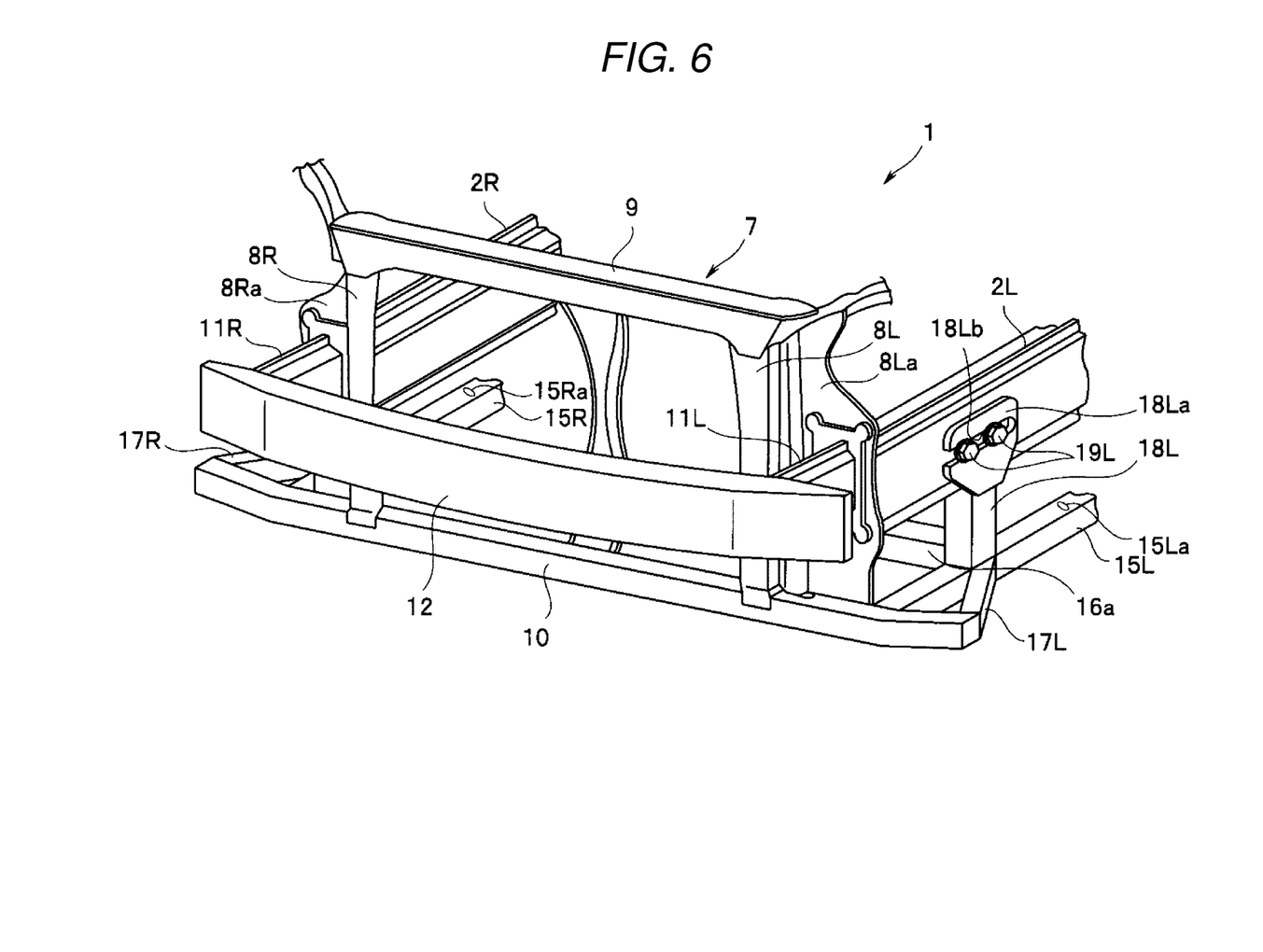
FIG. 6 is a perspective view partially illustrating a frame structure of a front portion of a vehicle body according to a first modification.
Figure 7:
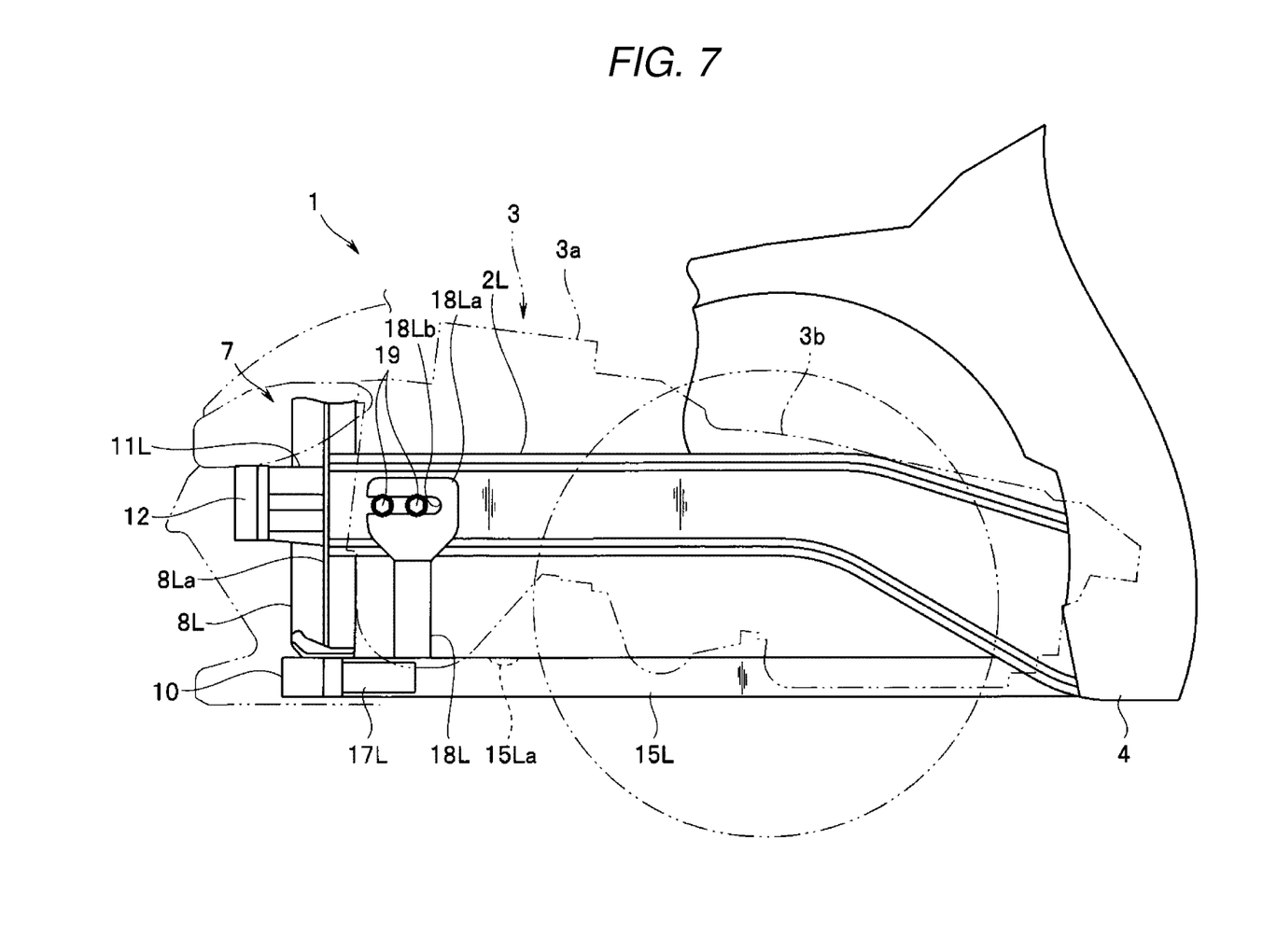
FIG. 7 is a side view partially illustrating the frame structure of the front portion of the vehicle body according to the first modification.
Figure 8:
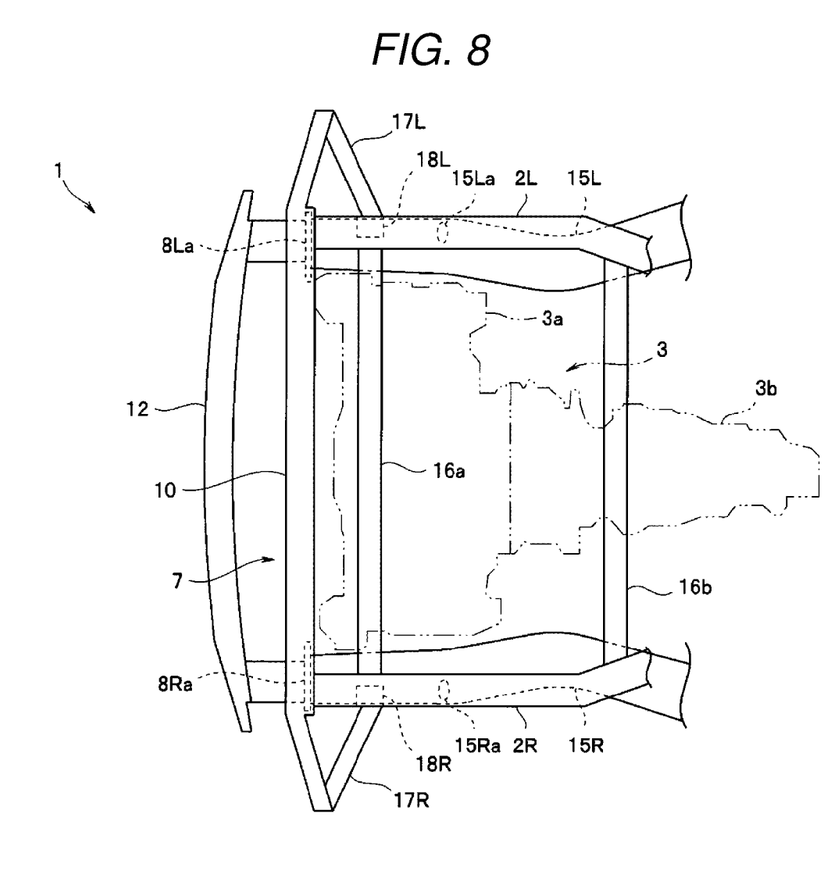
FIG. 8 is a bottom view partially illustrating the frame structure of the front portion of the vehicle body according to the first modification.

Here, for example, as illustrated in FIGS. 6 to 8, the front frames 2L and 2R and the load transmission members 18L and 18R may be temporarily coupled to each other respectively, in a state in which relative movement in a front-rear direction of the vehicle body is allowed.

In order to implement such temporary coupling, for example, as illustrated in FIGS. 6 and 7, the abutting plates 18La and 18Ra have slits 18Lb and 18Rb extending in the front-rear direction of the vehicle body 1. Front ends of the slits 18Lb and 18Rb in the front-rear direction of the vehicle body 1 are open, and rear ends thereof are closed.

Further, bolts 19 are inserted into the slits 18Lb and 18Rb. In one example, the bolts 19 may serve as "insertion members". The bolts 19 are screwed to outer-side portions of the front frames 2L and 2R in the vehicle width direction, so that the load transmission members 18L and 18R are temporarily coupled to the front frames 2L and 2R, respectively.

In the embodiment described above, the load transmission members 18L and 18R are coupled to the side surfaces of the sub-frames 15L and 15R, respectively. In the present modification, the load transmission members 18L and 18R are coupled to upper surfaces of the sub-frames 15L and 15R by welding, respectively.

Small Offset Frontal Collision

Figure 10:
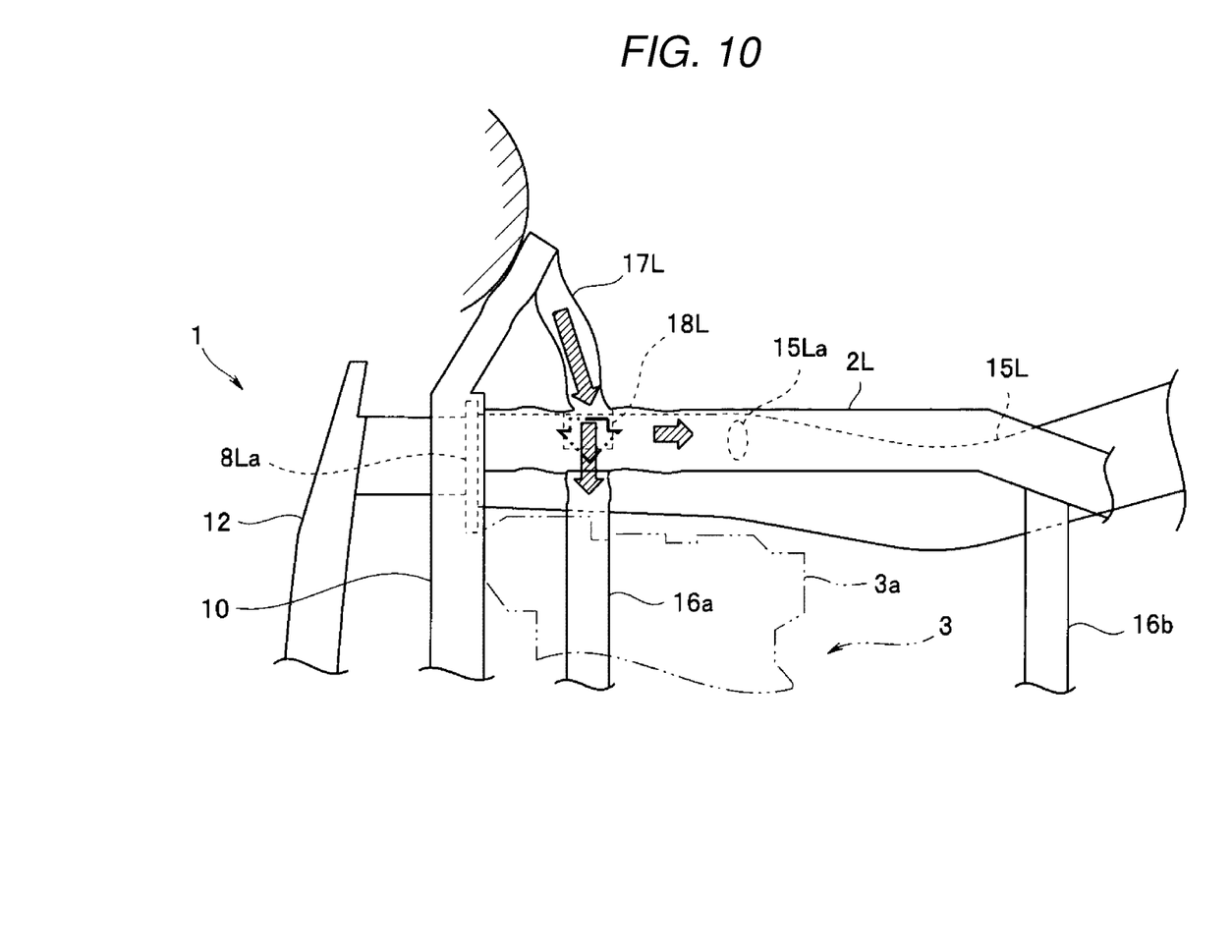
FIG. 10 illustrates an impact load transmitted to the frame of the front portion of the vehicle body according to the first modification in the event of a small offset frontal collision.

In such a configuration, for example, as illustrated in FIG. 10, when a small offset frontal collision occurs at a left portion of the vehicle body 1, an impact load caused by the collision is applied to a left portion of the lower support 10. In one example, the lower support 10 may serve as the "second bumper beam". Then, the vehicle body 1 behaves in the same manner as in the embodiment described above, to absorb the impact load. However, since the load transmission member 18L is temporarily coupled to the front frame 2L, even when parts of the vehicle body 1 are deformed, the load transmission member 18L (the abutting plate 18La) can be always disposed on the side surface of the front frame 2L, and the impact load transmitted to the sub-frame 15L can be appropriately transmitted to the front frame 2L.

Full Wrap Frontal Collision

Meanwhile, for example, as illustrated in FIG. 4, when a full wrap frontal collision (or an offset frontal collision) occurs at the vehicle body 1, an impact load is applied to the first bumper beam 12. A part of the impact load applied to the first bumper beam 12 is absorbed by crushing the crash boxes 11L and 11R.

Further, the impact load which is not absorbed by the crash boxes 11L and 11R crushes the front frames 2L and 2R.

Figure 9:
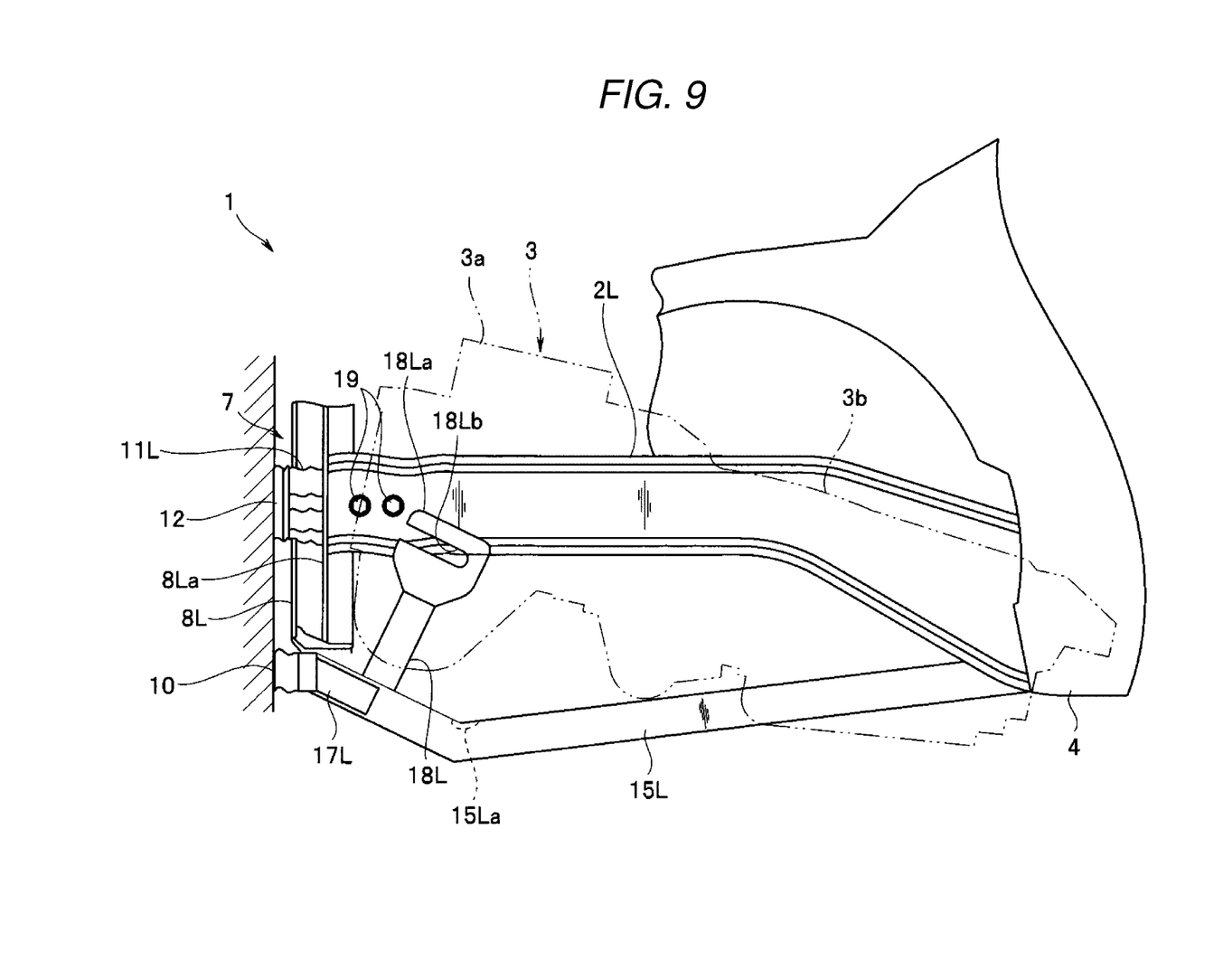
FIG. 9 illustrates a behavior of the frame of the front portion of the vehicle body according to the first modification in the event of a full wrap frontal collision.

In a process of the crushing, due to the impact load applied to the lower support 10, the sub-frames 15L and 15R are crushed and then bent downward at the fragile portions 15La and 15Ra. When the load transmission members 18L and 18R are tilted rearward of the vehicle body 1 due to the bending of the sub-frames 15L and 15R, the slits 18Lb and 18Rb are moved relative to the bolts 19, and the bolts 19 are separated from front ends of the opened slits 18Lb and 18Rb.

Accordingly, in the event of the full wrap frontal collision, the front frames 2L and 2R can appropriately absorb the impact load without the load transmission members 18L and 18R inhibiting the front frames 2L and 2R from crushing.

The disclosure is not limited to the embodiment described above. When the disclosure is practiced or the like, the disclosure may be modified in various manners without departing from the gist of the disclosure. Further, the embodiment includes disclosures at various stages, and various disclosures can be extracted from the embodiment by appropriately combining plural disclosed elements.

For example, the embodiment described above describes on the example in which the second bumper beam is also used as the lower support of the radiator core. It is noted that the disclosure is not limited to this example. The second bumper beam may be separated from the lower support of the radiator core. Further, in such a configuration, the second bumper beam may be disposed in front of the radiator core support.

The invention claimed is:

1. A vehicle body front structure comprising:
   a pair of left and right front frames extending in a front-rear direction of a vehicle body;
   a first bumper beam disposed in front of the front frames, the first bumper beam extending in a vehicle width direction;
   a pair of left and right sub-frames respectively disposed below the left and right front frames, the sub-frames extending in the front-rear direction of the vehicle body;
   a second bumper beam coupled to front ends of the sub-frames, the second bumper beam extending in such a manner that left and right ends of the second bumper beam protrude further outward in the vehicle width direction than the first bumper beam;
   gussets each coupled to:
      a corresponding one of ends of the second bumper beam; and
      a corresponding one of intermediate portions of the sub-frames, the gussets being configured to transmit an impact load that is applied to the second bumper beam, to the intermediate portions of the sub-frames; and
   load transmission members coupled to the sub-frames respectively in a vicinity of the gussets, the load transmission members being respectively disposed on outer side surfaces of the front frame in the vehicle width direction,
   wherein the load transmission members are disposed closer to a rear of the vehicle body in the front-rear direction than the gussets.

2. The vehicle body front structure according to claim 1, wherein each of the load transmission members comprises an abutting plate that can be in surface contact with the outer side surface of the front frame in the vehicle width direction.

3. The vehicle body front structure according to claim 2, wherein
   the abutting plate is formed with a slit extending in the front-rear direction of the vehicle body, the slit including an open front, and
   the abutting plate is coupled to the front frame by an insertion member insertable into the slit.

4. The vehicle body front structure according to claim 1, wherein each of the load transmission members comprises an abutting plate that transmits the impact load to the outer side surfaces of the front frames, and
   wherein the abutting plate includes a slit extending in the front-rear direction of the vehicle body.

5. The vehicle body front structure according to claim 1, wherein each of the load transmission members comprises an abutting plate with a slit extending in the front-rear direction of the vehicle body.

6. The vehicle body front structure according to claim 1, wherein each of the load transmission members comprises an abutting plate that is coupled to the front frame by an insertion member insertable into the abutting plate.

7. The vehicle body front structure according to claim 1, wherein each of the load transmission members comprises an abutting plate with a slit, and
   wherein the abutting plate is coupled to the front frame by an insertion member insertable into the slit.

8. The vehicle body front structure according to claim 1, wherein each of the load transmission members comprises an abutting plate with a slit, and
   wherein the abutting plate is coupled to the front frame via the slit.

9. The vehicle body front structure according to claim 1, wherein the load transmission members are disposed in contact with the sub-frame.

10. The vehicle body front structure according to claim 1, wherein the load transmission members include a rectangular cylindrical shape in cross section.

11. The vehicle body front structure according to claim 1, wherein upper portions of the load transmission members are disposed on the outer side surfaces of the front frame in the vehicle width direction, respectively, in a state in which a relative movement thereof with respect to the front frame in the front-rear direction is not restrained.

12. The vehicle body front structure according to claim 1, wherein the load transmission members include a material capable of being welded to the front frame.

13. The vehicle body front structure according to claim 1, further comprising a cross member which extends in the vehicle width direction,
wherein the pair of left and right sub-frames are coupled to each other via the cross member.

14. The vehicle body front structure according to claim 13, wherein the cross member is attached to the intermediate portions of the sub-frames such that the gusset and the cross member are attached to opposite sides of the intermediate portions of the sub-frames.

15. A vehicle body front structure comprising:
a pair of left and right front frames extending in a front-rear direction of a vehicle body;
a first bumper beam disposed in front of the front frames, the first bumper beam extending in a vehicle width direction;
a pair of left and right sub-frames respectively disposed below the left and right front frames, the sub-frames extending in the front-rear direction of the vehicle body;
a second bumper beam coupled to front ends of the sub-frames, the second bumper beam extending in such a manner that left and right ends of the second bumper beam protrude further outward in the vehicle width direction than the first bumper beam;
gussets each coupled to the second bumper beam and the sub-frames; and
load transmission members coupled to the sub-frames respectively in a vicinity of the gussets,
wherein each of the load transmission members comprises an abutting plate that can be in surface contact with the outer side surface of the front frame in the vehicle width direction, and
wherein the abutting plate includes a slit extending in the front-rear direction of the vehicle body.

16. The vehicle body front structure according to claim 15, wherein the load transmission members are disposed in contact with the sub-frame.

17. The vehicle body front structure according to claim 15, further comprising a cross member which extends in the vehicle width direction,
wherein the pair of left and right sub-frames are coupled to each other via the cross member.

18. The vehicle body front structure according to claim 17, wherein the cross member is attached to the intermediate portions of the sub-frames such that the gusset and the cross member are attached to opposite sides of the intermediate portions of the sub-frames.

19. A vehicle body front structure comprising:
a pair of left and right front frames extending in a front-rear direction of a vehicle body;
a first bumper beam disposed in front of the front frames, the first bumper beam extending in a vehicle width direction;
a pair of left and right sub-frames respectively disposed below the left and right front frames, the sub-frames extending in the front-rear direction of the vehicle body;
a second bumper beam coupled to front ends of the sub-frames, the second bumper beam extending in such a manner that left and right ends of the second bumper beam protrude further outward in the vehicle width direction than the first bumper beam;
gussets each coupled to the second bumper beam and the sub-frames; and
load transmission members coupled to the sub-frames respectively in a vicinity of the gussets,
wherein each of the load transmission members comprises an abutting plate that is coupled to the front frame by an insertion member insertable into the abutting plate.

20. The vehicle body front structure according to claim 19, further comprising a cross member which extends in the vehicle width direction,
wherein the pair of left and right sub-frames are coupled to each other via the cross member, and
wherein the cross member is attached to the intermediate portions of the sub-frames such that the gusset and the cross member are attached to opposite sides of the intermediate portions of the sub-frames.

* * * * *